United States Patent Office 2,699,985
Patented Jan. 18, 1955

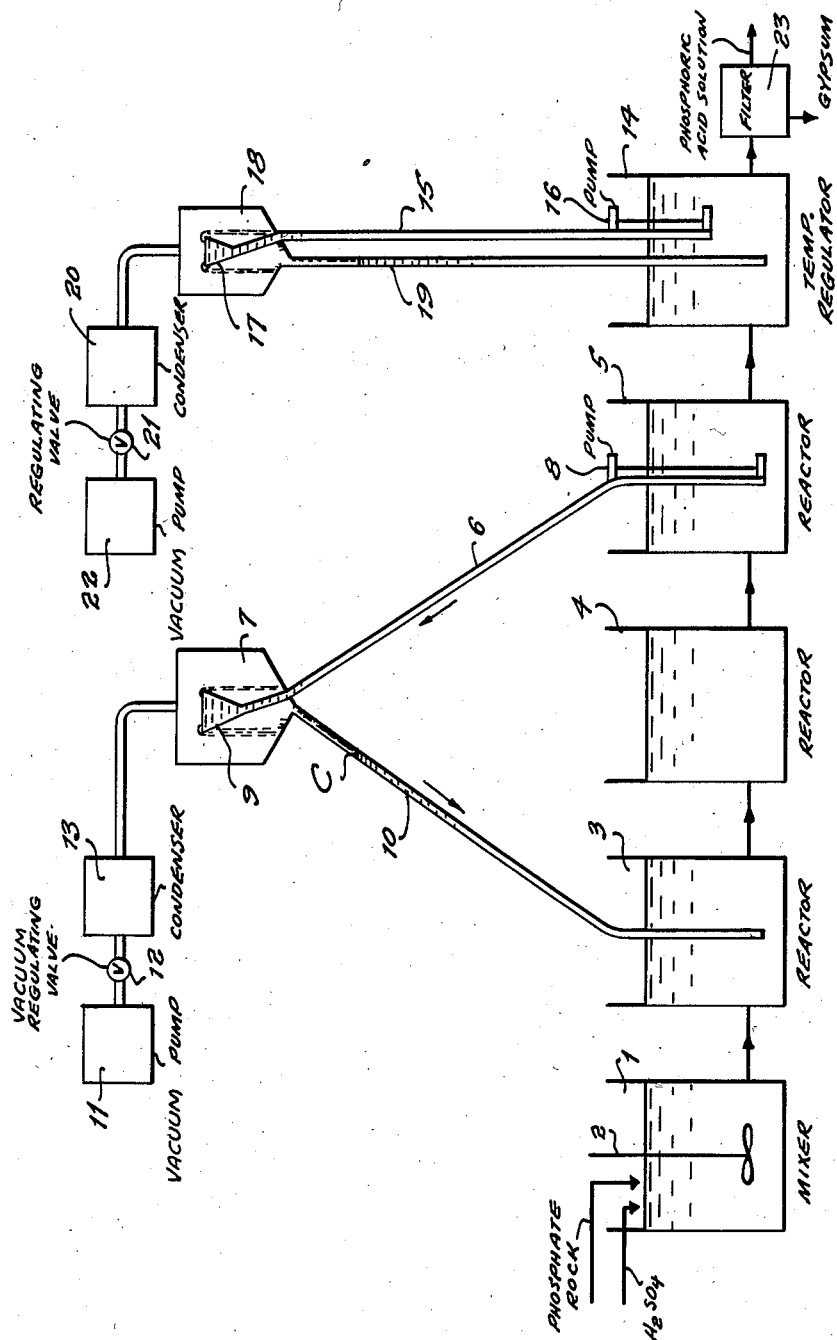

2,699,985

APPARATUS FOR PRODUCTION OF PHOSPHORIC ACID

Andre Delruelle, Trooz, Belgium, assignor to Industrial and Financial Association, Inc., Panama, Republic of Panama, a corporation of Panama Application October 30, 1950, Serial No. 192,959

Claims priority, application France March 3, 1950

7 Claims. (Cl. 23—165)

This invention relates to the production of phosphoric acid by reacting phosphate rock with sulfuric acid and more particularly to a method of controlling the temperature of the reaction material or slurry formed by the mixing and reaction of ground phosphate rock with an aqueous sulfuric acid solution.

The production of phosphoric acid by such a reaction is an exothermic process which generates relatively large amounts of heat in the reaction material. It is well known that much of this heat must be dissipated in order to maintain efficient operations and to obtain the gypsum formed as a by-product in a crystalline condition permitting it to be separated efficiently. The control generally considered necessary involves maintaining the reacting slurry at a temperature between about 60° and 80° C., depending upon the nature of the phosphate rock being used.

Conventional methods of removing this heat have proved unsatisfactory. For example, the elimination of the excess exothermic heat through cooled conducting walls or coils is impractical, since the cooling surfaces become rapidly coated with gypsum which forms crusts that destroy the heat conduction capacity and efficiency.

According to one commercially employed process, the reacting slurry is cooled by injecting cool air below the surface of the liquid. That method requires a large volume of air to obtain adequate cooling and thus necessitates objectionable expenditures of power. The air injection tuyères rapidly become covered with incrustations and require careful attention. Furthermore, the force of the air leaving the surface of the reacting slurry objectionably entrains droplets of the acid solution.

The general object of the present invention is to react phosphate rock and aqueous sulfuric acid under well controlled temperature conditions such that efficient reaction and efficient crystallization of gypsum are obtained, and such that the crystals formed do not obstruct the crystallization apparatus and are readily separable by filtration.

A more particular object is to provide a method and apparatus for controlling the temperature of the reacting slurry whereby (1) any desired temperature can be maintained at any selected zone or zones in its path of flow; (2) the temperature difference existing between any two zones, hence the maximum or mean temperature of the slurry flowing through and between them, can be established and held constant so as to avoid adverse effects from excess reaction heat; (3) the temperature or temperature difference maintained can be adjusted easily to any desired value; (4) as the slurry is cooled a proportionate concentration of the liquid occurs with a beneficial effect upon the crystallization of gypsum; and (5) the cooling operations are effected simply and with little requirements for additional energy or motive power.

Another object of this invention is to provide a method and apparatus for use in the production of phosphoric acid, whereby the reacted slurry of phosphate rock and sulfuric acid is cooled efficiently at the end of the reaction to a materially lowered temperature for filtration, for example to the range of 40° to 45° C., in order to complete the crystallization of gypsum and avoid objectionable deposits thereof upon chilling surfaces of conduits or filtering apparatus through which the finished slurry is conveyed.

Still another object of the invention is to provide an apparatus or system whereby the cooling of a heated portion of the reacting slurry brings about also a recirculation of that portion from a more advanced to a less advanced stage or zone in the path of flow of the reaction material.

According to the present invention, a phosphoric acid slurry formed by mixing and reacting ground phosphate rock and aqueous sulfuric acid is cooled by subjecting at least a portion of the exothermically heated slurry to a partial vacuum under which vaporization of water occurs to effect a desired reduction of its temperature. The vacuum is applied to slurry that has been heated by reaction, at a reduced pressure not exceeding the vapor pressure of water at the reduced temperature desired to be established, so that water evaporates to cool and concentrate and crystallize gypsum in the slurry simultaneously until the desired reduced temperature has been attained.

In thus employing a partial vacuum the present invention enables perfect control of the slurry temperature, for any desired temperature can be obtained with suitable apparatus simply by adjustment of the degree of vacuum applied.

The slurry to which the vacuum is applied may be lifted with aid of the vacuum directly from an appropriate stage or zone of its flow path into a suitable cooling zone or evaporation chamber; and as the vacuum-induced evaporation cools it in the latter it may be decanted or overflowed therein so as to fall to the bottom of the chamber, and then discharged directly back into any desired stage or zone of said path. In order to limit the general reaction temperature, heated slurry may be taken from an advanced stage or zone of reaction, decanted and cooled in an evaporization chamber as described and returned from the evaporation chamber into a less advanced zone of the reaction path; while in preparing reacted slurry for filtration part of such slurry may be taken from a vessel at the end of said path, decanted and cooled in a further evaporization chamber as described and returned from this evaporation chamber back to the remainder of the reacted slurry. Suitable feeding means such as a pump may be applied to the column of slurry entering each evaporation chamber, in order to supplement the lifting effect of the vacuum and maintain a suitable regulated flow through such chamber.

According to a preferred embodiment of the invention, the reaction material or slurry is passed continuously through a flow path comprising a series of two or more reaction zones provided either in separate vessels or in separate compartments of the same vessel. A feeding standpipe fitted with a pump delivers reacting slurry continuously from a relatively advanced reaction zone into a slurry distributing and decanting vessel within an evaporation chamber in which the material overflows a rim of said vessel and falls to the bottom of said chamber as a sheet-like free liquid downfall so as to be cooled and concentrated and crystallized efficiently under vacuum maintained therein, and another standpipe connected with the bottom of the same chamber leads the cooled slurry back into a less advanced reaction zone. A similar arrangement of standpipes serving an evaporation chamber is provided for the reacted slurry at the end of the flow path, e. g., in the last of a series of reaction zones or tanks employed. And each evaporation chamber is connected to a suitable evacuating system by which a degree of vacuum effecting the desired vaporization cooling in such chamber may be maintained.

The present invention may be carried out satisfactorily in the manner shown diagrammatically in the accompanying drawing.

With reference to the drawing, ground phosphate rock and sulfuric acid solution are fed into a first tank 1 wherein mixing of the ingredients is accomplished by means of agitator 2 and reaction commences. The reacting slurry then flows successively through reactor tanks 3, 4, and 5 wherein the reaction proceeds and goes substantially to completion, forming phosphoric acid and gypsum crystals in the slurry.

The cooling of the reacting slurry and maintenance thereof at a suitable mean temperature between 60° and 80° C., are accomplished in a recycling operation involving flowing part of the exothermically heated slurry in tank 5 upwardly through a standpipe 6 to the evaporator 7 at an elevated level above tank 5. The vacuum maintained in chamber 7 lifts the slurry to a certain height in pipe 6 and is supplemented by the action of pump 8 which maintains a suitable rate of flow through the cooling system. The slurry overflows or spills from the rim of the funnel shaped top or weir 9 of pipe 6, which constitutes a slurry decanting vessel within the evaporation chamber, and meanwhile is subjected to a predetermined degree of vacuum inducing the required vaporization and reduction of its temperature.

The slurry decanted from the enlarged top 9 of the pipe falls freely to the bottom of chamber 7 in the form of a widely distributed thin liquid downfall which is subjected throughout to the action of the vacuum maintained in the chamber. The vacuum causes uniform evaporation of water from the slurry to an extent that is readily controlled by regulating the degree of vacuum applied, and this evaporation produces not only a controlled cooling and concentration of the slurry liquid but also a controlled crystallization of the gypsum formed or forming therein. The downfalling liquid undergoes crystallization out of contact with cooling surfaces, and when it strikes the downwardly sloped bottom of the evaporation chamber it flows vigorously thereover to the bottom outlet, thus preventing or impeding crystal crust formations. Further, the walls of chamber 7 present an extensive surface area for cooling and condensing water vapors drawn from the slurry, and water condensing and flowing down these walls assists in the avoidance of crystal crust formations.

The overflowing slurry passes downward from chamber 7 into the standpipe 10 which extends at its lower end into the body of slurry held by tank 3 and is connected at its upper end with the bottom of the evaporator 7. Thus the cooled slurry joins a body of liquid in tank 3 that is lifted into pipe 10 to a level indicated at C, the height of which depends upon the degree of vacuum applied at 7. The height of the return pipe is such that the bottom of chamber 7 is always above the level C to which the barometric column of slurry in that pipe is raised by the vacuum in chamber 7, so that this slurry column never obstructs the fall of slurry decanted in that chamber. A regulatable partial vacuum is maintained in the evaporator by means of a vacuum pump 11 and a vacuum regulating valve 12 connected therewith through a condenser 13 as indicated in the drawing.

Slurry distributing means other than the funnel shaped pipe end 9 may be employed in the evaporator for increasing the surface exposure of the slurry liquid.

The main and unrecirculated part of the slurry in tank 5 passes into a final tank 14 in the flow path, which is provided with a cooling, crystallizing and temperature control apparatus embodying the principles hereinbefore mentioned. Thus, a feeding standpipe 15 connected with pump 16 extends at its lower end into the liquid in tank 14 and has a wide overflow mouth or weir 17 at its upper end inside evaporation chamber 18. A return standpipe 19 connected with the bottom of the evaporation chamber carries the cooled slurry portion back into tank 14; and a condenser 20, vacuum regulating valve 21 and vacuum pump 22 are connected with chamber 18 for maintaining the desired degree of vacuum therein.

By suitable control of the degree of vacuum in chamber 18 and of the rate of flow of reacted slurry therethrough, the slurry in tank 14 is held at a reduced temperature desired for efficient conduct of the filtering operation, which temperature ordinarily is below 50° C. and advantageously may be, for example, from 40° to 45° C. Thus the slurry is brought to a final condition in which the gypsum crystals are readily separated from the phosphoric acid solution, and upon passing it to filtering apparatus in this cooled condition one avoids or reduces troubles otherwise caused by crystallization on chilling surfaces of the conduits or filtering apparatus. A filter is represented diagrammatically at 23, from which phosphoric acid solution is taken off in one direction while the gypsum is separately discharged.

The length or height of the standpipes used for each cooling stage is calculated to limit the distance of fall of liquid from the top, depending upon the density of the liquid and the degrees of vacuum that may be required to obtain desired cooling and crystallizing effects. The lifting of slurry into the decanting vessel at the top of the said pipe can be accomplished solely by action of the vacuum, but in such case the liquid level in the tank to which the cooled slurry is returned must be lower than the liquid level in the tank from which the heated slurry is drawn, the difference of level corresponding practically to the height of fall in the evaporator. In such an arrangement a pump is used to assure the continuous elevation of the liquid from the lower level to the higher level of the two tanks.

The instant invention contemplates other arrangements than that shown for applying vacuum to cool the heated phosphoric acid slurry. In embodiments of the type shown, the number of reaction vessels used may be varied, and an evaporator-standpipe system may be associated with any one vessel or with any two vessels or zones of reaction between which a desired temperature difference is to be maintained. Various parts of the evaporating and vacuum forming apparatus may be used in common for regulation of the temperature in more than one tank. For example, an evaporation chamber may be connected to either one or a plurality of return pipes, each going to a different tank, and to either one or a plurality of slurry feed pipes each leading from a different tank, and the different tanks can be provided with individual control means for regulating the flow of slurry through each of them according to practical needs.

An evaporation system as described presents the advantage that the liquid or slurry being cooled and concentrated overflows vigorously into the evacuated space of the evaporation chamber and is subjected therein to efficient action of the vacuum throughout all the mass of the overflowing material. This action causes the precipitation of calcium sulphate dissolved in the weak phosphoric acid of the slurry and promotes the formation of large gypsum crystals which are easier to filter than small crystals.

The process and apparatus of the invention have several advantageous characteristics as follows:

A. The cooling is accomplished by direct action in the reaction material and without requiring contact thereof with chilled surfaces.

B. The temperature is efficiently regulated by controlling the degree of vacuum, which control can be easily effected by conventional automatic control apparatus or by a simple valve or other manually adjustable means.

C. The operation of the cooling process is economical due to the relatively small amount of power required.

D. The vacuum-evaporation not only cools but also concentrates the slurry, thus yielding a more concentrated phosphoric acid product.

E. All the excess heat is abstracted from the slurry as latent heat of vaporization of water, the elevated temperature of the slurry being utilized in conjunction with a vacuum or reduction of external pressure for this purpose.

F. The crystallization of gypsum is brought about under accurate control and so as to yield relatively large and easily filterable crystals.

G. The main body of slurry is held in the successive reaction tanks at a temperature and concentration such that the gypsum is kept dissolved in the dilute acid of this slurry, and the desired slurry concentration and gypsum precipitation are brought about away from these tanks in the evaporation chamber or chambers where the effects obtained are subject to accurate control.

It should be understood that the present invention is not limited to the embodiments herein specifically described and illustrated but extends to equivalent embodiments utilizing the principles herein disclosed as defined in the appended claims.

I claim:

1. In an apparatus for the production of phosphoric acid comprising a series of communicating compartments to hold pools of a continuously flowing body of a reaction slurry formed of aqueous sulfuric acid and ground phosphate rock, an evaporation chamber at a level above said compartments, a slurry feed pipe extending upwardly into said chamber from below the slurry level of one of said compartments, an open top decanting vessel at the upper end of said pipe within said chamber for spreading out and decanting slurry lifted through said feed pipe, said vessel having a horizontal overflow rim spaced above the bottom of said chamber for decanting such slurry to said bottom in a sheet-like free liquid downfall, means for maintaining a predetermined vacuum in said chamber sufficient to cool, concentrate and crystallize gypsum in the slurry decanted therein, said bottom being sloped downward to drain the decanted slurry freely therefrom and another pipe extending from one of said compartments to a lower part of said chamber bottom for receiving the drained slurry and returning it into said body.

2. An apparatus as described in claim 1, and a pump connected with said feed pipe for continuously forcing slurry through the latter and said decantaing vessel at a regulated rate.

3. An apparatus as described in claim 1, said vessel being an enlarged funnel-shaped extension of the upper end of said feed pipe and forming said overflow rim around its upper edge.

4. An apparatus as described in claim 1, the feed pipe and the return pipe respectively communicating with different compartments of said series.

5. An apparatus as described in claim 1, said return pipe having a height above the slurry level of the compartment from which it extends exceeding the height of the barometric slurry column formed therein by said vacuum maintaining means.

6. In an apparatus for the production of phosphoric acid, comprising a series of communicating compartments to hold pools of a continuously flowing body of a reaction slurry formed of aqueous sulfuric acid and ground phosphate rock, an evaporation chamber at a level above said compartments, a feed pipe extending upwardly into said chamber from below the slurry level of one of said compartments, a decanting vessel at the upper end of said feed pipe within said chamber for continuously spreading out and decanting slurry fed through said feed pipe, said vessel having a horizontal overflow rim spaced above the bottom of said chamber for decanting such slurry to said bottom in a sheet-like free liquid downfall, a pump for feeding slurry at a regulated rate through said feed pipe to overflow said vessel, means for maintaining in said chamber a predetermined vacuum effective to cool, concentrate and crystallize gypsum in the slurry decanted therein, said chamber having a downwardly sloped bottom spaced below said overflow rim in the path of fall of the decanted slurry for continuously draining off the latter, and another pipe extending from a lower part of said bottom to a point below the slurry level of another of said compartments for returning cooled, concentrated and crystallized slurry into said body, said return pipe having a height above the slurry level of said other compartment exceeding the height of the barometric slurry column supported by said vacuum maintaining means.

7. In an apparatus for the production of phosphoric acid, comprising a compartment for holding at least part of a body of a phosphoric acid reaction slurry formed of aqueous sulfuric acid and phosphoric rock, an evaporation chamber at an elevated level above said compartment, a slurry feed pipe extending upwardly into said chamber from a point in said compartment below the slurry level therein, an open top decanting vessel connected to the end of said pipe within said chamber, said pipe feeding directly and upwardly into the bottom of said vessel, means for continuously feeding slurry from said compartment upwardly through said pipe and said vessel, the top of said vessel having a substantially horizontal overflow rim spaced above the bottom and from the sides of said chamber, said rim being operative to spread out and decant in said chamber, in the form of a sheet-like free liquid downfall therein, the stream of slurry fed through said vessel, means for maintaining in said chamber a predetermined vacuum sufficient to cool, concentrate and crystallize gypsum in the slurry decanted therein, and a slurry return pipe extending from said chamber downwardly into a part of said body, for continuously receiving the cooled slurry and returning it into said body, said chamber comprising means for continuously freely directing the decanted slurry from said downfall into said return pipe, said vacuum maintaining a barometric slurry column in said return pipe substantially above the last mentioned part of said body, and the bottom of said chamber being at a height exceeding the height of said barometric slurry column.

References Cited in the file of this patent

UNITED STATES PATENTS

| | | |
|---|---|---|
| 1,028,737 | Kestner | June 4, 1912 |
| 1,145,728 | Wiegand | July 6, 1915 |
| 1,836,694 | Wadsted | Dec. 15, 1931 |
| 1,991,733 | Dean | Feb. 19, 1935 |
| 2,020,460 | Dean | Nov. 12, 1935 |
| 2,049,032 | Weber | July 28, 1936 |
| 2,064,609 | Humble | Dec. 15, 1936 |
| 2,064,833 | Howard | Dec. 22, 1936 |
| 2,091,898 | Weber | Aug. 31, 1937 |
| 2,109,347 | Beekhuis | Feb. 22, 1938 |
| 2,449,040 | Schideler et al. | Sept. 7, 1948 |

FOREIGN PATENTS

| | | |
|---|---|---|
| 14,775 | Great Britain | Oct. 31, 1887 |

OTHER REFERENCES

Weber: Chemical and Metallurgical Engineering, vol. 39, No. 12, December 1932, pages 659–662.

Riegel: "Chemical Machinery," Reinhold Pub. Co., N. Y., 1944, pages 397–401.